United States Patent
Umino et al.

(10) Patent No.: US 10,781,316 B2
(45) Date of Patent: Sep. 22, 2020

(54) ACRYLIC-MODIFIED ALKYD RESIN AND COATING MATERIAL FOR PRIMING FOR THIN INORGANIC FILM

(71) Applicant: DIC Corporation, Tokyo (JP)

(72) Inventors: Akio Umino, Ichihara (JP); Seiichi Uno, Ichihara (JP)

(73) Assignee: DIC Corporation, Tokyo (JP)

( * ) Notice: Subject to any disclaimer, the term of this patent is extended or adjusted under 35 U.S.C. 154(b) by 113 days.

(21) Appl. No.: 16/081,556

(22) PCT Filed: Feb. 23, 2017

(86) PCT No.: PCT/JP2017/006771
§ 371 (c)(1),
(2) Date: Aug. 31, 2018

(87) PCT Pub. No.: WO2017/154591
PCT Pub. Date: Sep. 14, 2017

(65) Prior Publication Data
US 2019/0055411 A1    Feb. 21, 2019

(30) Foreign Application Priority Data

Mar. 10, 2016    (JP) ................ 2016-046963

(51) Int. Cl.
| | | |
|---|---|---|
| C09D 5/00 | (2006.01) | |
| C09D 133/10 | (2006.01) | |
| C09D 167/08 | (2006.01) | |
| C09D 4/06 | (2006.01) | |
| C08F 283/01 | (2006.01) | |
| C08F 285/00 | (2006.01) | |
| C09D 151/08 | (2006.01) | |
| C08F 2/44 | (2006.01) | |

(52) U.S. Cl.
CPC ............ *C09D 5/002* (2013.01); *C08F 2/44* (2013.01); *C08F 283/01* (2013.01); *C08F 285/00* (2013.01); *C09D 4/06* (2013.01); *C09D 133/10* (2013.01); *C09D 151/08* (2013.01); *C09D 167/08* (2013.01)

(58) Field of Classification Search
CPC ...... C09D 5/00; C09D 133/10; C09D 167/08; C09D 4/06

USPC ......................................................... 524/853
See application file for complete search history.

(56) References Cited

U.S. PATENT DOCUMENTS

| 4,116,903 | A | | 9/1978 | Lietz et al. | |
|---|---|---|---|---|---|
| 4,278,575 | A | | 7/1981 | Nakamura et al. | |
| 4,504,609 | A | * | 3/1985 | Kuwajima | C09D 5/02 |
| | | | | | 523/501 |
| 2009/0306241 | A1 | | 12/2009 | Allard et al. | |

FOREIGN PATENT DOCUMENTS

| JP | 54-062294 A | 5/1979 |
|---|---|---|
| JP | 61-023652 A | 2/1986 |
| JP | S61-287918 A | 12/1986 |
| JP | 62-020566 A | 1/1987 |
| JP | 2003-026710 A | 1/2003 |
| JP | 2003-049095 A | 2/2003 |
| JP | 2011-021152 A | 2/2011 |

OTHER PUBLICATIONS

International Search Report dated May 23, 2017, issued for PCT/JP2017/006771 and English translation thereof.
Written Opinion dated May 23, 2017, issued for issued for PCT/JP2017/006771.
Eupplementary European Search Report dated Sep. 25, 2019, issued for European Patent Application No. 17762931.8.

* cited by examiner

*Primary Examiner* — Deve V Hall
(74) *Attorney, Agent, or Firm* — Locke Lord LLP

(57) ABSTRACT

Provided are a coating material that is for undercoating for a thin inorganic film, has excellent adhesiveness to various base materials, and produces no appearance change or no peeling off even under high-temperature conditions, and an acrylic-modified alkyd resin as a raw material for such a coating material. The acrylic-modified alkyd resin includes a copolymer including as essential components: an alkyd resin (A) having an unsaturated bond in a molecular structure; and a polymerizable monomer (B) having an unsaturated bond in a molecular structure. Also provided are a curable composition, a coating material for undercoating for a thin inorganic film, and a molded body including an undercoat layer including the coating material for undercoating for a thin inorganic film.

20 Claims, No Drawings

ACRYLIC-MODIFIED ALKYD RESIN AND COATING MATERIAL FOR PRIMING FOR THIN INORGANIC FILM

TECHNICAL FIELD

The present invention relates to a coating material that is for undercoating for a thin inorganic film, has excellent adhesiveness to various base materials, and produces no appearance change or no peeling off even under high-temperature conditions, and also relates to an acrylic-modified alkyd resin as a raw material for such a coating material.

BACKGROUND ART

The manufacture of parts having metal tone gloss, such as automobile parts, household electric appliances, and cosmetic containers, widely uses a technique of forming a thin film of an inorganic material such as aluminum, tin, or silicon dioxide on a base material for parts by vacuum deposition, sputtering, or other methods. Examples of base materials being used include a bulk molding compound (BMC), polyphenylene sulfide (PPS), aluminum die cast (ALD), a polybutylene terephthalate (PBT)/polyethylene terephthalate (PET) alloy resin, polycarbonate (PC), an acrylonitrile-butadiene-styrene copolymer resin (ABS), a plastic base material such as a polycarbonate (PC) material reinforced with a filler such as glass fibers, a metal base material, and other various base materials. In recent years, the use of plastic base materials is increasing particularly from a viewpoint of weight reduction.

When a thin inorganic film is formed on a plastic base material, a method of forming a thin inorganic film directly on a plastic base material cannot provide sufficient smoothness for the surface of the thin inorganic film and can hardly produce desired metal tone gloss. Therefore, a known method for improving this includes first forming an undercoat layer on a plastic base material and forming a thin inorganic film thereon, so that the smoothness of the thin film surface is increased and high metal tone gloss is achieved.

A known coating material for the undercoat layer is, for example, a paint composition including a copolymer of styrene, acrylic ester, and acrylamide, a polyacrylate compound, and an amine compound (see PTL 1). A thin inorganic film formed on an undercoat layer of the paint composition disclosed in PTL 1 is characterized by having high surface smoothness and gloss. Particularly when formed by thick coating, however, such a thin inorganic film can easily crack or peel under high-temperature conditions. Therefore, there has been a demand for development of a coating material that is for undercoating for thin inorganic films and has high heat resistance regardless of film thickness.

CITATION LIST

Patent Literature

PTL 1: JP-A-2011-21152

SUMMARY OF INVENTION

Technical Problem

Thus, an object of the invention is to provide a coating material that is for undercoating for thin inorganic films, has excellent adhesiveness to various base materials, and produces no appearance change or no peeling off even under high-temperature conditions, and to provide an acrylic-modified alkyd resin as a raw material for such a coating material.

Solution to Problem

As a result of intensive studies for achieving the object, the inventors have found that an acrylic-modified alkyd resin, as a copolymer of an alkyd resin and a polymerizable monomer, has high adhesiveness to any of various plastic base materials with different physical properties and also has very good heat resistance, and have completed the invention.

Specifically, according to an aspect of the invention, there is provided an acrylic-modified alkyd resin including a copolymer including as essential components: an alkyd resin (A) having an unsaturated bond in a molecular structure; and a polymerizable monomer (B) having an unsaturated bond in a molecular structure.

According to another aspect of the invention, there is provided a curable composition including, as essential components, the acrylic-modified alkyd resin and a (meth)acrylate compound (X).

According to still another aspect of the invention, there is provided a cured material obtained by curing the curable composition.

According to still another aspect of the invention, there is provided a coating material for undercoating for a thin inorganic film, the coating material including the curable composition.

According to still another aspect of the invention, there is provided a molded body including an undercoat layer made from the coating material for undercoating for a thin inorganic film.

Advantageous Effects of Invention

The invention makes it possible to provide a coating material that is for undercoating for a thin inorganic film, has excellent adhesiveness to various base materials, and produces no appearance change or no peeling off even under high-temperature conditions and to provide an acrylic-modified alkyd resin as a raw material for such a coating material.

DESCRIPTION OF EMBODIMENTS

The acrylic-modified alkyd resin of the invention includes a copolymer including as essential components: an alkyd resin (A) having an unsaturated bond in a molecular structure; and a polymerizable monomer (B) having an unsaturated bond in a molecular structure.

The alkyd resin (A) having an unsaturated bond in a molecular structure may be a polyester resin having an unsaturated bond site in a molecular structure, and its specific structure is not particularly limited. The unsaturated bond in the alkyd resin (A) is a structural site for copolymerization with the polymerizable monomer (B) having an unsaturated bond in a molecular structure, which will be described later. An example of the alkyd resin (A) may be a polyester resin obtained from a polybasic acid (a1), a polyhydric alcohol (a2), and a fat, oil, or fatty acid (a3) as essential components.

Examples of the polybasic acid (a1) include aliphatic saturated dibasic acids such as malonic acid, succinic acid, glutaric acid, adipic acid, pimelic acid, suberic acid, azelaic acid, sebacic acid, undecanedioic acid, dodecanedioic acid, tridecanedioic acid, tetradecanedioic acid, pentadecanedioic acid, hexadecanedioic acid, heptadecanedioic acid, octadecanedioic acid, nonadecanedioic acid, and icosanedioic acid; aliphatic unsaturated dibasic acids such as maleic acid, maleic anhydride, fumaric acid, citraconic acid, itaconic acid, and glutaconic acid, and anhydrides thereof; alicyclic saturated dibasic acids such as hexahydrophthalic acid and 1,4-cyclohexanedicarboxylic acid; alicyclic unsaturated dibasic acids such as tetrahydrophthalic acid; aromatic dibasic acids such as phthalic acid, phthalic anhydride, isophthalic acid, and terephthalic acid and anhydrides thereof; aliphatic saturated tribasic acids such as 1,2,5-hexane tricarboxylic acid and 1,2,4-cyclohexane tricarboxylic acid; and aromatic tribasic acids such as trimellitic acid, trimellitic anhydride, 1,2,5-benzenetricarboxylic acid, and 2,5,7-naphthalenetricarboxylic acid and anhydrides thereof. These may be used alone or in combination of two or more kinds thereof. Among these, from a viewpoint of sufficiently proceeding copolymerization with the polymerizable monomer (B) and obtaining an acrylic-modified alkyd resin having further excellent adhesiveness to various base materials, a component having an unsaturated bond in a molecular structure is preferable, and fumaric acid or (anhydrous) maleic acid is particularly preferable.

In addition, in order to adjust the molecular weight of the obtained alkyd resin (A) or the like, a monobasic acid such as methanoic acid, ethanoic acid, propanoic acid, butanoic acid, pentanoic acid, hexanoic acid, heptanoic acid, octanoic acid, nonanoic acid, decanoic acid, dodecanoic acid, tetradecanoic acid, hexadecanoic acid, heptadecanoic acid, octadecanoic acid, or p-tert-butylbenzoic acid may be used in combination with the polybasic acid (a1). These may be used alone or in combination of two or more kinds thereof.

Examples of the polyhydric alcohol (a2) include diols such as ethylene glycol, propylene glycol, 1,3-propanediol, 1,2,2-trimethyl-1,3-propanediol, 2,2-dimethyl-3-isopropyl-1,3-propanediol, 1,4-butanediol, 1,3-butanediol, 3-methyl-1,3-butanediol, 1,5-pentanediol, 3-methyl-1,5-pentanediol, neopentyl glycol, 1,6-hexanediol, 1,4-bis (hydroxymethyl) cyclohexane, and 2,2,4-trimethyl-1,3-pentanediol; tri- or higher functional polyols such as trimethylolethane, trimethylolpropane, glycerin, hexanetriol, and pentaerythritol; modified polyether polyols obtained by ring-opening polymerization of diols or tri- or higher functional polyols, and various cyclic ether bond-containing compounds such as ethylene oxide, propylene oxide, tetrahydrofuran, ethyl glycidyl ether, propyl glycidyl ether, butyl glycidyl ether, phenyl glycidyl ether, and allyl glycidyl ether; and lactone-modified polyols obtained by polycondensation reaction of diols or tri- or higher functional polyols, and various lactone compounds such as ε-caprolactone. These may be used alone or in combination of two or more kinds thereof. Among these, from a viewpoint of obtaining the acrylic-modified alkyd resin having high adhesiveness to various base materials and excellent heat resistance, a tri- or higher functional polyol such as trimethylolethane, trimethylolpropane, glycerin, hexanetriol, or pentaerythritol, a modified polyether polyol, or a lactone-modified polyol thereof is preferably used.

Examples of the fat, oil, or fatty acid (a3) include fats and oils such as linseed oil, tung oil, rice oil, safflower oil, soybean oil, tall oil, rapeseed oil, palm oil, castor oil, dehydrated castor oil, and palm oil; fatty acid derived from these fat and oil; regenerated fats thereof; and higher fatty acids having 12 to 30 carbon atoms, such as oleic acid, linoleic acid, linolenic acid, arachidonic acid, and docosahexaenoic acid. These may be used alone or in combination of two or more kinds thereof. Among these, from a viewpoint of introducing an unsaturated bond to a molecular structure of the obtained alkyd resin (A), a fat or oil having an iodine value equal to or greater than 100, specifically, any one or more kinds of tung oil, linseed oil, dehydrated castor oil, soybean oil, safflower oil, and tall oil is preferably used.

The alkyd resin (A) may be a urethane-modified alkyd resin obtained by reaction of the components (a1) to (a3) and a polyisocyanate compound (a4). Examples of the polyisocyanate compound (a4) include aliphatic diisocyanates such as butane-1,4-diisocyanate, hexamethylene diisocyanate, 2,2,4-trimethylhexamethylene diisocyanate, 2,4,4-trimethylhexamethylene diisocyanate, xylylene diisocyanate, and m-tetramethylxylylene diisocyanate;

alicyclic diisocyanates such as cyclohexane-1,4-diisocyanate, isophorone diisocyanate, lysine diisocyanate, dicyclohexylmethane-4,4'-diisocyanate, 1,3-bis (isocyanatomethyl) cyclohexane, and methylcyclohexane diisocyanate;

aromatic diisocyanates such as 1,5-naphthylene diisocyanate, 4,4'-diphenylmethane diisocyanate, 4,4'-diphenyldimethylmethane diisocyanate, 4,4'-dibenzyl diisocyanate, dialkyl diphenyl methane diisocyanate, tetraalkyl diphenyl methane diisocyanate, 1,3-phenylene diisocyanate, 1,4-phenylene diisocyanate, and tolylene diisocyanate;

isocyanurate-modified polyisocyanates of various diisocyanates, adduct-modified polyisocyanates obtained by reaction of the various diisocyanates and polyol, biuret-modified polyisocyanates of various diisocyanates, and allophanate-modified polyisocyanates of various diisocyanates. These may be used alone or in combination of two or more kinds thereof.

The alkyd resin (A) may be a phenol-modified alkyd resin obtained by reaction of the components (a1) to (a3) and a phenol resin (a5). Examples of the phenol resin used here include resol type phenol resins and novolac type phenol resins.

When the polyisocyanate compound (a4) or the phenol resin (a5) is used, from a viewpoint of obtaining an acrylic-modified alkyd resin having further excellent adhesiveness to various base materials, the percentage of the total mass of the polybasic acid (a1), the polyhydric alcohol (a2), and the fat, oil or fatty acid (a3) to the total mass of reaction raw materials for the alkyd resin (A) is preferably equal to or greater than 70% by mass and more preferably 90% by mass.

The method of producing the alkyd resin (A) is not particularly limited. The alkyd resin (A) may be produced by, for example, a method of allowing, at a time, all raw materials including the polybasic acid (a1), the polyhydric alcohol (a2), the fat, oil, or fatty acid (a3), and optionally a monobasic acid, the polyisocyanate compound (a4) and the phenol resin (a5); a method of performing a multi-stage reaction that includes preparing a precursor by allowing some of the raw materials to react in advance and adding the other raw materials to allow them to react; or a method of separately adding some of the raw materials and allowing them to react with one another. In a case where the polybasic acid (a1), the polyhydric alcohol (a2), the fat and oil or fatty acid (a3), and optionally, monobasic acid are used as raw materials in the alkyd resin, a method of collectively causing a reaction of all of these at a temperature of approximately 120° C. to 300° C. is preferable. In a case of preparing the urethane-modified alkyd resin, it is preferable that the polybasic acid (a1), the polyhydric alcohol (a2), the fat and oil or fatty acid (a3), and optionally, monobasic acid are allowed to react at a temperature of approximately 120° C. to 300° C. and then the reaction is performed by adding the polyisocyanate compound (a4) at a temperature of approximately 50° C. to 100° C. In a case of preparing the phenol-modified alkyd resin, a method of collectively causing a reaction of all of the polybasic acid (a1), the polyhydric alcohol (a2), the fat and oil or fatty acid (a3), the phenol resin (a5), and optionally, monobasic acid at a temperature of approximately 120° C. to 300° C. is preferable. A degree of progress of the reaction can be monitored by measuring the amount of water distilled by a dehydration reaction, an acid value or a hydroxyl value, and the remaining amount of the isocyanate group. Optionally, an esterification catalyst or an urethanation catalyst may be used as appropriate.

The alkyd resin (A) may be allowed to react in an organic solvent, if necessary. In addition, after the reaction is completed, an organic solvent may be added to adjust viscosity or the amount of non-volatile components or the like. Examples of the organic solvent include ketone solvents such as acetone, methyl ethyl ketone (MEK), and methyl isobutyl ketone, cyclic ether solvents such as tetrahydrofuran (THF) and dioxolane, ester solvents such as methyl acetate, ethyl acetate, and butyl acetate, aromatic solvents such as toluene and xylene, and alcohol solvents such as carbitol, cellosolve, methanol, isopropanol, butanol, and propylene glycol monomethyl ether. These may be used alone or in combination of two or more kinds thereof.

From a viewpoint of obtaining an acrylic-modified alkyd resin having high adhesiveness to various base materials and excellent heat resistance, the oil length of the alkyd resin (A) is preferably 10 to 80 and more preferably 30 to 70. The oil length of the alkyd resin (A) is the mass ratio of the fat, oil or fatty acid (a3) to the total mass of solids in the resin raw materials for the alkyd resin (A) in terms of percentage.

From a viewpoint of obtaining an acrylic-modified alkyd resin having high adhesiveness to various base materials and excellent heat resistance, the weight average molecular weight (Mw) of the alkyd resin (A) is preferably 3,000 to 50,000 and the molecular weight distribution (Mw/Mn) thereof is preferably 2 to 20. The hydroxyl value thereof is preferably 50 to 250 mgKOH/g and the acid value thereof is preferably 2 to 20 mgKOH/g.

In the invention, the weight average molecular weight (Mw) and the molecular weight distribution (Mw/Mn) are values measured by gel permeation chromatography (GPC) under the following conditions.

Measurement device; manufactured by Tosoh Corporation, HLC-8320 GPC

Column; manufactured by Tosoh Corporation, TSKgel 4000HXL, TSKgel 3000HXL, TSKgel 2000HXL, TSKgel 1000HXL Detector; RI (differential refractometer)

Data processing; manufactured by Tosoh Corporation, GPC Work station EcoSEC-WS

Measurement conditions; column temperature: 40° C.

Solvent: tetrahydrofuran

Flow rate: 0.35 ml/min

Standard; monodisperse polystyrene

Sample: a filtrate (100 µl) obtained by filtering, with a micro-filter, a tetrahydrofuran solution with a concentration of 0.2% by mass on a resin solid basis Examples of the polymerizable monomer (B) having an unsaturated bond in a molecular structure include aliphatic (meth)acrylate monomers such as methyl (meth)acrylate, ethyl (meth)acrylate, propyl (meth)acrylate, butyl (meth)acrylate, pentyl (meth)acrylate, hexyl (meth)acrylate, heptyl (meth)acrylate, octyl (meth)acrylate, 2-ethylhexyl (meth)acrylate, and nonyl (meth)acrylate;

alicyclic (meth)acrylate monomers such as cyclohexyl (meth)acrylate, isobornyl (meth)acrylate, dicyclopentanyl (meth)acrylate, and adamantyl mono(meth)acrylate;

heterocyclic (meth)acrylate monomers such as glycidyl (meth)acrylate and tetrahydrofurfuryl acrylate;

aromatic (meth)acrylate monomers such as phenyl (meth)acrylate, benzyl (meth)acrylate, phenoxy (meth)acrylate, and phenoxyethyl acrylate;

hydroxyl group-containing (meth)acrylate monomers such as hydroxyethyl (meth)acrylate, hydroxypropyl (meth)acrylate, and hydroxybutyl acrylate;

carboxy group-containing (meth)acrylate monomers such as (meth)acrylic acid, (acryloyloxy) acetic acid, 2-carboxyethyl acrylate, and 3-carboxypropyl acrylate;

silyl group-containing (meth)acrylate monomers such as 3-methacryloxypropyltrimethoxysilane;

aminoalkyl (meth)acrylate monomers such as N,N-diethylaminoethyl (meth)acrylate, N,N-diethylaminoethyl (meth)acrylate, and N,N-diethylaminopropyl (meth)acrylate;

(per)fluoroalkyl (meth)acrylate monomers such as 2,2,2-trifluoroethyl (meth)acrylate, 2,2,3,3-tetrafluoropropyl (meth)acrylate, 1H, 1H, 5H-octafluoropentyl (meth)acrylate, 1H, 1H, 2H, 2H-heptadecafluorodecyl (meth)acrylate, and perfluoroethyloxyethyl (meth)acrylate;

(per)fluoroalkyl perfluorovinyl ethers including a (per)fluoroalkyl group having 1 to 18 carbon atoms, such as trifluoromethyl trifluorovinyl ether, pentafluoroethyl trifluorovinyl ether, and heptafluoropropyl trifluorovinyl ether;

unsaturated dicarboxylic acid esters such as dimethyl fumarate, diethyl fumarate, dibutyl fumarate, dimethyl itaconate, dibutyl itaconate, methyl ethyl fumarate, methyl butyl fumarate, and methylethyl itaconate;

aromatic vinyl monomers such as styrene, α-methylstyrene, and chlorostyrene;

diene compounds such as butadiene, isoprene, piperylene, and dimethylbutadiene;

vinyl halides or vinylidene halides such as vinyl chloride and vinyl bromide;

unsaturated ketones such as methyl vinyl ketone and butyl vinyl ketone;

vinyl esters such as vinyl acetate and vinyl butyrate;

vinyl ethers such as methyl vinyl ether and butyl vinyl ether;

vinyl cyanides such as acrylonitrile, methacrylonitrile, and vinylidene cyanide;

acrylamides or alkyd substituted amides thereof;

N-substituted maleimides such as N-phenyl maleimide and N-cyclohexyl maleimide; and fluorine-containing α-olefins such as vinyl fluoride, vinylidene fluoride, trifluoroethylene, chlorotrifluoroethylene, bromotrifluoroethylene, pentafluoropropylene, and hexafluoropropylene. These may be used alone or in combination of two or more kinds thereof.

Among these, from a viewpoint of obtaining an acrylic-modified alkyd resin having excellent adhesiveness to various base materials, the hydroxyl group-containing (meth)acrylate monomer is preferably used as an essential component. In this case, a percentage of the hydroxyl group-containing (meth)acrylate monomer in the polymerizable monomer (B) having an unsaturated bond in a molecular structure is preferably 5% to 50% by mass and more preferably 5% to 30% by mass.

From a viewpoint of obtaining an acrylic-modified alkyd resin having excellent heat resistance, the aromatic vinyl monomer is preferably used as an essential component. In this case, the percentage of the aromatic vinyl monomer in the polymerizable monomers (B) having an unsaturated bond in the molecular structure is preferably 5% to 50% by mass and more preferably 10% to 40% by mass.

The method of copolymerizing the alkyd resin (A) having an unsaturated bond in the molecular structure and the polymerizable monomer (B) having an unsaturated bond in the molecular structure, as essential components, to form the acrylic-modified alkyd resin of the invention is not particularly limited. For example, the acrylic-modified alkyd resin may be produced by a general method for producing an acrylic resin. An example of such a method includes, for example, allowing the alkyd resin (A) having an unsaturated bond in the molecular structure to react with the polymerizable monomer (B) having an unsaturated bond in the molecular structure in the presence of a known common acrylic polymerization catalyst optionally in an organic solvent.

Specifically, first, the alkyd resin (A) having an unsaturated bond in the molecular structure is added to a reaction vessel, to which the organic solvent is optionally added. The material is heated to approximately 70° C. to 150° C. in a nitrogen flow environment. A mixture of the polymerizable monomer (B) having an unsaturated bond in the molecular structure and the acrylic polymerization catalyst is continuously or intermittently added thereto for a polymerization reaction, so that the desired acrylic-modified alkyd resin is obtained.

Regarding the reaction ratio of the alkyd resin (A) having an unsaturated bond in the molecular structure and the polymerizable monomer (B) having an unsaturated bond in the molecular structure, the mass ratio [(A)/(B)] between them is preferably 5/95 to 95/5 and more preferably 50/50 to 90/10, from a viewpoint of obtaining the acrylic-modified alkyd resin having high adhesiveness to various base materials and excellent heat resistance.

From a viewpoint of obtaining the acrylic-modified alkyd resin having high adhesiveness to various base materials and excellent heat resistance, the acrylic-modified alkyd resin of the invention preferably has a weight average molecular weight (Mw) of 5,000 to 500,000 and a molecular weight distribution (Mw/Mn) of 2 to 20. The acrylic-modified alkyd resin of the invention preferably has a hydroxyl value of 30 to 200 mgKOH/g and an acid value of 2 to 20 mgKOH/g.

From a viewpoint of obtaining the acrylic-modified alkyd resin having high adhesiveness to various base materials and excellent heat resistance, the oil length of the acrylic-modified alkyd resin of the invention is preferably 10 to 80 and more preferably 30 to 60.

The curable composition of the invention includes the acrylic-modified alkyd resin and a (meth)acrylate compound (X). Examples of the (meth)acrylate compound (X) include various components such as a (meth)acrylate monomer (X1), a urethane (meth)acrylate (X2), and an epoxy (meth)acrylate (X3).

Examples of the (meth)acrylate monomer (X1) include aliphatic mono(meth)acrylate compounds such as methyl (meth)acrylate, ethyl (meth)acrylate, propyl (meth)acrylate, and butyl (meth)acrylate; alicyclic mono(meth)acrylate compounds such as cyclohexyl (meth)acrylate, isobornyl (meth)acrylate, and adamantyl mono(meth)acrylate; heterocyclic mono(meth)acrylate compounds such as glycidyl (meth)acrylate and tetrahydrofurfuryl acrylate; aromatic mono(meth)acrylate compounds such as benzyl (meth)acrylate and phenoxy (meth)acrylate; hydroxyl group-containing mono(meth)acrylate compounds such as hydroxyethyl (meth)acrylate and hydroxypropyl (meth)acrylate; polyoxyalkylene-modified mono(meth)acrylate compounds obtained by introducing a polyoxyalkylene chain such as a polyoxyethylene chain, a polyoxypropylene chain, or a polyoxytetramethylene chain in the molecular structure of various mono(meth)acrylate compounds; lactone-modified mono(meth)acrylate compounds obtained by introducing a (poly) lactone structure in the molecular structure of various mono(meth)acrylate compounds;

aliphatic di(meth)acrylate compounds such as ethylene glycol di(meth)acrylate, propylene glycol di(meth)acrylate, butanediol di(meth)acrylate, hexanediol di(meth)acrylate, and neopentyl glycol di(meth)acrylate; alicyclic di(meth)acrylate compounds such as norbornane di(meth)acrylate, norbornane dimethanol di(meth)acrylate, dicyclopentanyl di(meth)acrylate, and tricyclodecanedimethanol di(meth)acrylate; aromatic di(meth)acrylate compounds such as biphenol di(meth)acrylate and bisphenol di(meth)acrylate; polyoxyalkylene-modified di(meth)acrylate compounds obtained by introducing a polyoxyalkylene chain such as a polyoxyethylene chain, a polyoxypropylene chain, or a polyoxytetramethylene chain in the molecular structure of various di(meth)acrylate compounds; lactone-modified di(meth)acrylate compounds obtained by introducing a (poly) lactone structure in the molecular structure of various di(meth)acrylate compounds;

aliphatic tri(meth)acrylate compounds such as trimethylolpropane tri(meth)acrylate and glycerin tri(meth)acrylate; hydroxyl group-containing tri(meth)acrylate compounds such as pentaerythritol tri(meth)acrylate, ditrimethylolpropane tri(meth)acrylate, and dipentaerythritol tri(meth)acrylate; polyoxyalkylene-modified tri(meth)acrylate compounds obtained by introducing a polyoxyalkylene chain such as a polyoxyethylene chain, a polyoxypropylene chain, or a polyoxytetramethylene chain in the molecular structure of various tri(meth)acrylate compounds; lactone-modified tri(meth)acrylate compounds obtained by introducing a (poly) lactone structure in the molecular structure of various tri(meth)acrylate compounds;

tetra- or higher functional aliphatic poly (meth)acrylate compounds such as pentaerythritol tetra(meth)acrylate, ditrimethylol propane tetra(meth)acrylate, and dipentaerythritol hexa(meth)acrylate; tetra- or higher functional hydroxyl group-containing poly(meth)acrylate compounds such as dipentaerythritol tetra(meth)acrylate and dipentaerythritol penta(meth)acrylate; tetra- or higher functional polyoxyalkylene-modified poly(meth)acrylate compounds obtained by introducing a polyoxyalkylene chain such as a polyoxyethylene chain, a polyoxypropylene chain, or a polyoxytetramethylene chain in the molecular structure of various poly (meth)acrylate compounds; and tetra- or higher functional lactone-modified poly(meth)acrylate compounds obtained by introducing a (poly) lactone structure in the molecular structure of various poly (meth)acrylate compounds.

The urethane (meth)acrylate compound (X2) may be, for example, a compound obtained by reaction of any of various polyisocyanate compounds, a hydroxyl group-containing (meth)acrylate compound, and optionally any of various polyol compounds. Examples of the polyisocyanate compound include diisocyanate compounds such as hexamethylene diisocyanate, isophorone diisocyanate, tolylene diisocyanate, xylylene diisocyanate, and 4,4'-diphenylmethane diisocyanate, nurate modified products, adduct modified products, and biuret modified products thereof. Examples of the hydroxyl group-containing (meth)acrylate compound include hydroxyethyl (meth)acrylate, hydroxypropyl (meth) acrylate, trimethylolpropane diacrylate, pentaerythritol tri (meth)acrylate, dipentaerythritol penta(meth)acrylate, and polyoxyalkylene-modified products, and polylactone-modified products thereof. Examples of the polyol compound include ethylene glycol, propylene glycol, butanediol, hexanediol, polyoxyethylene glycol, polyoxypropylene glycol, glycerin, trimethylolpropane, and pentaerythritol.

The epoxy (meth)acrylate compound (X3) may be a bisphenol type epoxy resin or a (meth)acrylate ester of an epoxy group-containing compound such as trimethylolpropane triglycidyl ether.

These (meth)acrylate compounds (X) may be used alone or in combination of two or more kinds thereof. Among these, from viewpoints of having high curing properties, and excellent heat resistance and surface smoothness in a case of obtaining a coating material for undercoating for a thin inorganic film, the (meth)acrylate monomer (X1) is preferable and a tri or higher functional (meth)acrylate compound is more preferable. In addition, from viewpoints of having high adhesiveness to various base materials, and excellent heat resistance and surface smoothness in a case of obtaining a coating material for undercoating for a thin inorganic film, the urethane (meth)acrylate compound (X2) is preferable.

In the invention, a compound having an unsaturated bond other than a (meth)acryloyl group, such as diallyl fumarate or triallyl isocyanurate, may be used in combination with the (meth)acrylate compounds (X).

The ratio of the acrylic-modified alkyd resin to the (meth)acrylate compound (X) in the curable composition of the invention can be adjusted as desired in accordance with desired properties. From a viewpoint of obtaining a cured film having excellent adhesiveness to various plastic base materials and heat resistance, the mass ratio [acrylic-modified alkyd resin/(meth)acrylate compound (X)] between them is preferably 5/95 to 80/20.

From a viewpoint of obtaining a cured film having excellent adhesiveness to various plastic base materials and heat resistance, the total mass of the acrylic-modified alkyd resin and the (meth)acrylate compound (X) in 100 parts by mass of the total resin solids in the curable composition is preferably equal to or greater than 65 parts by mass, more preferably equal to or greater than 70 parts by mass, and particularly preferably equal to or greater than 80 parts by mass.

In order to allow the active energy beam curing reaction to proceed well, the curable composition of the invention preferably includes a photoinitiator. The photoinitiator is not particularly limited, as long as it generates a radical by the action of light, and specific examples thereof include 4-phenoxy dichloroacetophenone, 4-t-butyl-dichloroacetophenone, diethoxyacetophenone, 2-hydroxy-2-methyl-1-phenylpropan-1-one, 1-(4-isopropylenephenyl)-2-hydroxy-2-methylpropan-1-one, 1-(4-dodecylphenyl)-2-hydroxy-2-methylpropan-1-one, 4-(2-hydroxyethoxy)-phenyl (2-hydroxy-2-propyl) ketone, 1-hydroxycyclohexyl phenyl ketone, 2-methyl-1-[4-(methylthio) phenyl]-2-morpholinopropane-1, benzoin, benzoin methyl ether, benzoin ethyl ether, benzoin isopropyl ether, benzoin isobutyl ether, benzyl dimethyl ketal, benzophenone, benzoyl benzoic acid, methyl benzoylbenzoate, 4-phenylbenzophenone, hydroxybenzophenone, 4-benzoyl-4'-methyldiphenylsulfide, 3,3'-dimethyl-4-methoxybenzophenone, thioxanthone, 2-chlorothioxanthone, 2-methylthioxanthone, 2,4-dimethylthioxanthone, isopropylthioxanthone, camphorquinone, dibenzosuberone, 2-ethylanthraquinone, 4',4"-diethylisophthalophenone, 3,3',4,4'-tetra(t-butylperoxycarbonyl)benzophenone, α-acyloxime ester, acylphosphine oxide, methylphenylglyoxylate, benzyl, 9,10-phenanthrenequinone, 4-(2-hydroxyethoxy) phenyl-(2-hydroxy-2-propyl) ketone, dimethylaminobenzoic acid, and dimethylaminobenzoic acid alkyl ester. Among these, benzyl dimethyl ketal, 1-hydroxy cyclohexyl phenyl ketone, benzoyl isopropyl ether, 4-(2-hydroxyethoxy)-phenyl (2-hydroxy-2-propyl) ketone, 2-hydroxy-2-methyl-1-phenylpropan-1-one, dimethylaminobenzoic acid, and dimethylaminobenzoic acid alkyl ester are preferable, and dimethylaminobenzoic acid, and dimethylaminobenzoic acid alkyl ester are particularly preferably used.

Examples of commercially available products of the photoinitiator include IRGACURE 184, IRGACURE 149, IRGACURE 261, IRGACURE 369, IRGACURE 500, IRGACURE 651, IRGACURE 754, IRGACURE 784, IRGACURE 819, IRGACURE 907, IRGACURE 1116, IRGACURE 1664, IRGACURE 1700, IRGACURE 1800, IRGACURE 1850, IRGACURE 2959, IRGACURE 4043, DAROCURE 1173, LUCIRIN TPO (manufactured by BASF), KAYACURE DETX, KAYACURE MBP, KAYACURE DMBI, KAYACURE EPA, KAYACURE OA (manufactured by Nippon Kayaku Co., Ltd.), VICURE 10, VICURE 55 (manufactured by Stauffer Chemical Company), TRIGONAL P1 (manufactured by AKZO Co., Ltd.), SANDORAY 1000 (manufactured by Sandos), DEAP (manufactured by APJOHN Co., LTD.), QUANTACURE PDO, QUANTACURE ITX, and QUANTACURE EPD (manufactured by Ward Blenkinsop). These may be used alone or in combination of two or more kinds thereof.

The photoinitiator should have good light sensitivity and should not cause precipitation of crystals, deterioration of coating physical properties, or the like. From these points of view, 100 parts by mass of the curable composition of the invention should preferably contain 0.05 to 20 parts by mass, more preferably 0.1 to 10 parts by mass of the photoinitiator.

In the invention, an amino resin may be added, if necessary, in addition to each component described above, so that the heat resistance of the obtained film can be further improved.

Examples of the amino resin include methylolated amino resins obtained by synthesizing at least one kind of melamine, urea, and benzoguanamine, and formaldehydes; and methylolated amino resins obtained by alkyl etherification of some or all of the methylol groups with a lower monohydric alcohol such as methanol, ethanol, propanol, isopropanol, butanol, or isobutanol.

Specific examples of such an amino resin include CYMEL 303 (manufactured by Nihon Cytec Industries Inc., methylated melamine resin), CYMEL 350 (manufactured by Nihon Cytec Industries Inc., methylated melamine resin), U-VAN 520 (manufactured by Mitsui Chemicals, Inc., n-butylated modified melamine resin), U-VAN 20-SE-60 (manufactured by Mitsui Chemicals, Inc., n-butylated modified melamine resin), U-VAN 2021 (manufactured by Mitsui Chemicals, Inc., n-butylated modified melamine resin), U-VAN 220 (manufactured by Mitsui Chemicals, Inc., n-butylated modified melamine resin), U-VAN 22R (manufactured by Mitsui Chemicals, Inc., n-butylated modified melamine resin), U-VAN 2028 (manufactured by Mitsui Chemicals, Inc., n-butylated modified melamine resin), U-VAN 165 (manufactured by Mitsui Chemicals, Inc., isobutylated modified melamine resin), U-VAN 114 (manufactured by Mitsui Chemicals, Inc., isobutylated modified melamine resin), U-VAN 62 (manufactured by Mitsui Chemicals, Inc., isobutylated modified melamine resin), and U-VAN 60R (manufactured by Mitsui Chemicals, Inc., isobutylated modified melamine resin).

In the case of using the amino resin, the curable composition preferably contains 3 to 20 parts by mass of the amino resin with respect to 100 parts by mass of the total of the acrylic-modified alkyd resin and the (meth)acrylate compound (X) in the curable composition.

In addition, in the case of using the amino resin, an acid compound such as a phosphate ester may be added as a curing accelerator. The amount of the curing accelerator added is preferably 0.1 to 10 parts by mass with respect to 100 parts by mass of the amino resin.

The curable composition of the invention may include a solvent, in order to be easily diluted and applied. The solvent is not particularly limited, and a low surface tension solvent is preferable, in order to increase wettability. Examples thereof include alcohol type solvents and ketone type solvents. In addition to this, ethyl acetate, butyl acetate, toluene, xylene, or the like may be used in combination, from a viewpoint of an evaporation rate or cost.

The curable composition of the invention may include a surface conditioning agent. The surface conditioning agent is not particularly limited, and examples thereof include a fluorine-based additive and a cellulose-based additive. The fluorine-based additive has a function of preventing cissing in a case of performing the coating with respect to various base materials, by decreasing surface tensile and increasing wettability. Specific examples of the fluorine-based additive include MEGAFACE F-177 (manufactured by DIC Corporation).

The cellulose-based additive has a function of applying film forming properties in a case of performing the coating. As the cellulose-based additive, a high-molecular-weight product having a number average molecular weight equal to or greater than 15,000 is preferable, in order to decrease fluidity, and examples thereof include a cellulose acetate-butyrate resin.

In the invention, in a case where the amount of fluorine-based additive increases, a deterioration of adhesiveness of a thin inorganic film or a top coat is caused, and in a case where the amount of the cellulose-based additive increases, the content of solids in the composition of the invention is decreased, and the film is hardly attached. And therefore, the fluorine-based additive and the cellulose-based additive are preferably used in combination.

Regarding the amount of the surface conditioning agent added, the total amount of the fluorine-based additive and the cellulose-based additive is preferably 0.01 to 3.0 parts by mass with respect to 100 parts by mass of the total amount of the non-volatile components of the curable composition. In the case of using the fluorine-based additive alone, the content thereof is preferably 0.01 to 1.0 parts by mass, and in the case of using the cellulose-based additive alone, the content thereof is preferably 0.5 to 5.0 parts by mass.

The curable composition of the invention may further include any of various additives, such as a photosensitizer, an ultraviolet absorber, an antioxidant, a silicon additive, a rheology control agent, a defoaming agent, an antistatic agent, and an anti-fogging agent. The amount of the additives can be set within a range where the effect of the additives can be sufficiently produced and the curing is not inhibited.

The curable composition of the invention can be advantageously used as the coating material for undercoating for a thin inorganic film. Specifically, the curable composition is used as an undercoat when a thin inorganic film layer is formed on a base material. Hereinafter, various conditions for the use of the curable composition of the invention as the coating material for undercoating for a thin inorganic film will be described.

The curable composition of the invention has high adhesiveness to various base materials, and thus, the base material is not particularly limited and various materials can be used. Specific examples thereof include various resin materials such as polyethylene terephthalate (PET) resins, polybutylene terephthalate (PBT) resins, PET/PBT alloy resins, unsaturated polyester resins, polyethylene resins, polypropylene resins, polyphenylene sulfide (PPS) resins, polycarbonate resins, and acrylonitrile-butadiene-styrene copolymer resins (ABS), resin materials reinforced with glass fibers or a filling agent, such as bulk molding compound (BMC), and aluminum die cast (ALD).

When the undercoat layer is formed, the curable composition of the invention is applied onto the base material by a method such as spray coating, dip coating, spin coating, flow coating, or roller coating. In this process, the curable composition is preferably applied in such an amount that the cured film can have a thickness of 5 to 100 µm, more preferably 10 to 70 µm. In addition, the whole of the coating film may fail to have an even thickness, and the coating film may partially vary in thickness. In general, coating films with an uneven thickness or a large thickness equal to or greater than 30 µm can easily crack or peel from the base material under high-temperature conditions. In contrast, the curable composition of the invention, which includes the acrylic-modified alkyd resin of the invention, can form a coating film that has sufficiently high heat resistance and resists cracking or peeling even when having an uneven thickness or a large thickness equal to or greater than 30 µm.

After the curable composition is applied onto the base material by the above method, preheating is performed under the temperature condition of 50° C. to 150° C. for 1 to 25 minutes, in order to volatilize the organic solvent in the curable composition.

After the preheating step is completed, active energy rays are applied to cure the curable composition so that the undercoat layer is formed. Examples of the active energy rays used in the invention include ultraviolet rays and electron beams. For curing with ultraviolet rays, an ultraviolet irradiation device may be used, including a xenon lamp, a high-pressure mercury lamp, or a metal halide lamp as a light source. If necessary, the light intensity, the placement of the light source, and the like may be adjusted. In the invention, the ultraviolet rays are preferably applied at a total dose of 50 to 5,000 mJ/cm$^2$, more preferably 300 to 2,000 mJ/cm$^2$.

A thin film of an inorganic material is formed by such a method as vacuum deposition or sputtering on the base material, on which the undercoat layer according to the invention has been provided as described above. If desired, a topcoat layer or the like may be further provided thereon. Examples of the inorganic material include silicon, aluminum, iron, nickel, chromium, copper, silver, zinc, tin, indium, magnesium, zirconium, titanium, oxides thereof, and alloys thereof. The thin inorganic film preferably has a thickness of 30 nm to 3 µm. Examples of the topcoat layer include clear coating films formed using an acrylic lacquer paint, an acrylic melamine cured paint, an aluminum chelate acrylic paint, or an active energy ray curable paint, and SiOx layers formed by a plasma polymerization method. In a case where the topcoat layer is a clear coating film, it preferably has a thickness of 3 to 40 µm. In addition, in a case where the topcoat layer is a SiOx layer, it preferably has a thickness of 30 to 300 nm.

The molded body obtained as described above may be an automobile reflecting mirror or the like. When the curable composition of the invention is used to form an undercoat layer for a thin inorganic film, a molded body is obtained in which the thin inorganic film has excellent metal tone gloss, excellent adhesiveness to the base material, and excellent heat resistance. In addition, the curable composition of the invention also has excellent storage stability.

EXAMPLES

Hereinafter, the invention will be described in more detail with reference to specific synthesis examples and examples. Hereinafter, "parts" and "%" are based on mass, unless otherwise noted.

[Method for Measurement of Weight Average Molecular Weight (Mw) and Molecular Weight Distribution (Mw/Mn)]

The weight average molecular weight (Mw) and the molecular weight distribution (Mw/Mn) were measured by gel permeation chromatography (GPC) under the following conditions.

Measurement device; manufactured by Tosoh Corporation, HLC-8320 GPC

Column; manufactured by Tosoh Corporation, TSKgel 4000HXL, TSKgel 3000HXL, TSKgel 2000HXL, TSKgel 1000HXL Detector; RI (differential refractometer)

Data processing; manufactured by Tosoh Corporation, GPC Work station EcoSEC-WS

Measurement conditions; column temperature: 40° C.

Solvent: tetrahydrofuran

Flow rate: 0.35 ml/min

Standard; monodisperse polystyrene

Sample: a filtrate (100 μl) obtained by filtering, with a micro-filter, a tetrahydrofuran solution with a concentration of 0.2% by mass on a resin solid basis Preparation Example 1: Preparation of Alkyd Resin (A-1)

To a flask equipped with a stirring bar, a temperature sensor, and a rectifying tube were added 760 parts by mass of dehydrated castor oil, 150 parts by mass of pentaerythritol, 140 parts by mass of trimethylolpropane, 345 parts by mass of phthalic anhydride, and 10 parts by mass of maleic anhydride, and heated to 210° C. to 230° C. with stirring while dry nitrogen was allowed to flow into the flask, so that a dehydration condensation reaction was performed. When an acid value of 8.0 mgKOH/g was reached, the reaction was stopped. After cooling to 150° C., butyl acetate was added dropwise for dilution to a solid content of 70% by mass, so that an alkyd resin (A-1) solution was obtained. The obtained alkyd resin (A-1) had an oil length of 60, a weight average molecular weight (Mw) of 10,500, a molecular weight distribution (Mw/Mn) of 4.5, a hydroxyl value of 141 mgKOH/g, and an acid value of 8.0 mgKOH/g.

Preparation Example 2: Preparation of Alkyd Resin (A-2)

To a flask equipped with a stirring bar, a temperature sensor, and a rectifying tube were added 580 parts by mass of linseed oil, 120 parts by mass of pentaerythritol, 180 parts by mass of glycerin, and 480 parts by mass of phthalic anhydride, and heated to 210° C. to 230° C. with stirring while dry nitrogen was allowed to flow into the flask, so that a dehydration condensation reaction was performed. When an acid value of 5.0 mgKOH/g was reached, the reaction was stopped. After cooling to 150° C., butyl acetate was added dropwise for dilution to a solid content of 70% by mass, so that an alkyd resin (A-2) solution was obtained. The obtained alkyd resin (A-2) had an oil length of 50, a weight average molecular weight (Mw) of 9,500, a molecular weight distribution (Mw/Mn) of 5.6, a hydroxyl value of 180 mgKOH/g, and an acid value of 5.6 mgKOH/g.

Example 1: Preparation of Acrylic-Modified Alkyd Resin (1)

To a flask equipped with a stirring bar, a temperature sensor, a condenser, and a dropping funnel were added 326 parts by mass of butyl acetate and 714 parts by mass (solid content) of the alkyd resin (A-1), and heated to 80° C. to 90° C. with stirring while dry nitrogen was allowed to flow into the flask. To the dropping funnel were added 180 parts by mass of methyl methacrylate, 50 parts by mass of 2-hydroxyethyl methacrylate, 70 parts by mass of styrene, and 10 parts by mass of tert-butyl peroxy-2-ethylhexanoate, and then the mixture was added dropwise into the flask over 4 hours. The acrylic polymerization reaction was further continued at 80° C. to 90° C. for 4 hours. The reaction mixture was diluted with butyl acetate to a solid content of 60% by mass, so that an acrylic-modified alkyd resin (1) solution was obtained. The obtained acrylic-modified alkyd resin (1) had an oil length of 42, a weight average molecular weight (Mw) of 25,000, a molecular weight distribution (Mw/Mn) of 8.5, a hydroxyl value of 120 mgKOH/g, and an acid value of 7.6 mgKOH/g.

Example 2: Preparation of Acrylic-Modified Alkyd Resin (2)

To a flask equipped with a stirring bar, a temperature sensor, a condenser, and a dropping funnel were added 326 parts by mass of butyl acetate and 714 parts by mass (solid content) of the alkyd resin (A-2), and heated to 80° C. to 90° C. with stirring while dry nitrogen was allowed to flow into the flask. To the dropping funnel were added 180 parts by mass of methyl methacrylate, 50 parts by mass of 2-hydroxyethyl methacrylate, 70 parts by mass of styrene, and 10 parts by mass of tert-butyl peroxy-2-ethylhexanoate, and then the mixture was added dropwise into the flask over 4 hours. The acrylic polymerization reaction was further continued at 80° C. to 90° C. for 4 hours. The reaction mixture was diluted with butyl acetate to a solid content of 60% by mass, so that an acrylic-modified alkyd resin (2) solution was obtained. The obtained acrylic-modified alkyd resin (2) had an oil length of 35, a weight average molecular weight (Mw) of 18,000, a molecular weight distribution (Mw/Mn) of 7.4, a hydroxyl value of 145 mgKOH/g, and an acid value of 6.0 mgKOH/g.

Comparative Preparation Example 1: Preparation of Acrylic Resin (1')

To a flask equipped with a stirring bar, a temperature sensor, and a condenser were added 410 parts by mass of butyl acetate, and heated to 80° C. to 90° C. To the dropping funnel were added 160 parts by mass of styrene, 20 parts by mass of methyl methacrylate, 100 parts by mass of n-butyl acrylate, 40 parts by mass of 4-hydroxybutyl acrylate, 80 parts by mass of N-(n-butoxymethyl)acrylamide, and 10 parts by mass of tert-butyl peroxy-2-ethylhexanoate as a polymerization initiator, and then the mixture was added dropwise into the flask over 4 hours. The acrylic polymerization reaction was further continued at 80° C. to 90° C. for 4 hours. Butyl acetate was added as needed to the reaction mixture, so that an acrylic resin (1') solution with a solid content of 50% was obtained.

Examples 3 to 7 and Comparative Example 1

The components were mixed in the ratio shown in Table 1 to form a curable composition. The mixture was evaluated in various ways as shown below. The results are shown in Table 1.

The details of each compound used in the present examples are as follows.

(Meth)acrylate compound (X-1): UNIDIC V-4000BA manufactured by DIC Corporation
(Meth)acrylate compound (X-2): UNIDIC V-4001EA manufactured by DIC Corporation
(Meth)acrylate compound (X-3): UNIDIC V-4025 manufactured by DIC Corporation
(Meth)acrylate compound (X-4): mixture of dipentaerythritol pentaacrylate and hexaacrylate (ARONIX M-402 manufactured by Toagosei Co., Ltd.)
(Meth)acrylate compound (X-5): mixture of pentaerythritol triacrylate and tetraacrylate (ARONIX M-305 manufactured by Toagosei Co., Ltd.)
(Meth)acrylate compound (X-6): trimethylolpropane triacrylate (TMPTA) (ARONIX M-309 manufactured by Toagosei Co., Ltd.)
(Meth)acrylate compound (X-7): tripropylene glycol diacrylate (ARONIX M-220 manufactured by Toagosei Co., Ltd.)
(Meth)acrylate compound (X-8): tricyclodecanedimethanol diacrylate (NK ESTER A-DCP manufactured by Shin-Nakamura Chemical Co., Ltd.)
Amino resin: CYMEL 303 manufactured by Nihon Cytec Industries Inc.
Photoinitiator (1): IRGACURE 651 manufactured by BASF
Photoinitiator (2): IRGACURE 184 manufactured by BASF
Surface modifier: MEGAFACE F-477 manufactured by DIC Corporation Preparation of Test Pieces The curable composition was applied onto a plastic base material by spraying with a spray gun and then dried at 80° C. for 10 minutes. The curable composition was then irradiated with ultraviolet rays at a dose of 1,000 mJ/cm$^2$ from an 80 W/cm high-pressure mercury lamp to form an undercoat layer with a specific thickness on the plastic base material. Subsequently, a vapor-deposited aluminum layer with a thickness of 100 nm was formed on the surface of the undercoat layer by using a vacuum deposition device, so that each of test pieces 1 to 4 was obtained.

The kind of the plastic base material of each test piece and the thickness of the undercoat layer are as follows.

Test piece 1: bulk molding compound (BMC) base material, undercoat thickness of 15 to 20 μm
Test piece 2: bulk molding compound (BMC) base material, undercoat thickness of 45 to 50 μm
Test piece 3: acrylonitrile-butadiene-styrene copolymer resin (ABS) base material, undercoat thickness of 15 to 20 μm
Test piece 4: polycarbonate (PC) base material, undercoat thickness of 15 to 20 μm Initial Evaluation of Appearance The surface smoothness of the test pieces was visually evaluated. The evaluation was performed with the following criteria.

A: The surface is smooth with no iridescence, whitening, cracking, or projections observed.

B: Iridescence, whitening, cracking, or projections are observed.

Initial Evaluation of Adhesiveness

The adhesiveness was evaluated by a cross-cut peel test. Using a cutter knife, a 10×10 grid pattern at intervals of 2 mm was formed on each test piece, so that 100 grids each with an area of 2 mm$^2$ were obtained. A cellophane tape was bonded onto the grid pattern and then rapidly removed. The number of grids remaining without peeling was then counted. The evaluation was performed with the following criteria.

4: The number of remaining grids is 100.
3: The number of remaining grids is 80 to 99.
2: The number of remaining grids is 50 to 79.
1: The number of remaining grids is equal to or smaller than 49.

Evaluation after Heat Resistance Test

The test pieces were placed for 96 hours in a hot air drying oven set at the temperature shown below and then evaluated for appearance and adhesiveness in the same manner as in the initial evaluation.

Bulk molding compound (BMC) base material (test pieces 1 and 2) at 200° C.
Acrylonitrile-butadiene-styrene copolymer resin (ABS) base material (test piece 3) at 80° C.
Polycarbonate (PC) base material (test piece 4) at 120° C.

Evaluation of Storage Stability

The curable composition was stored at 40° C. for three months, and storage stability was visually evaluated. The evaluation was performed with the following criteria.

A: There is no change in appearance and viscosity.
B: A change in viscosity is observed, or gel is produced.

TABLE 1

|  | Example 3 | Example 4 | Example 5 | Example 6 | Example 7 | Comparative Example 1 |
|---|---|---|---|---|---|---|
| Acrylic-modified alkyd resin (1) [parts by mass (solid content)] | 30 |  | 30 | 10 | 60 |  |
| Acrylic-modified alkyd resin (2) [parts by mass (solid content)] |  | 30 |  |  |  |  |
| Acrylic resin (1') [parts by mass (solid content)] |  |  |  |  |  | 33 |
| (Meth)acrylate compound (X-1) [parts by mass (solid content)] | 60 |  |  |  | 10 |  |
| (Meth)acrylate compound (X-2) [parts by mass (solid content)] |  | 60 | 50 | 60 |  |  |
| (Meth)acrylate compound (X-3) [parts by mass (solid content)] |  |  | 10 |  | 10 |  |
| (Meth)acrylate compound (X-4) [parts by mass] |  |  |  |  | 10 | 20 |
| (Meth)acrylate compound (X-5) [parts by mass] |  |  |  | 10 |  | 25 |
| (Meth)acrylate compound (X-6) [parts by mass] |  |  |  | 10 |  |  |
| (Meth)acrylate compound (X-7) [parts by mass] | 10 | 10 |  |  | 10 | 12 |
| (Meth)acrylate compound (X-8) [parts by mass] |  |  | 10 | 5 |  |  |
| Amino resin [parts by mass (solid content)] |  | 10 |  | 5 |  | 10 |

TABLE 1-continued

| | | | Example 3 | Example 4 | Example 5 | Example 6 | Example 7 | Comparative Example 1 |
|---|---|---|---|---|---|---|---|---|
| Photoinitiator (1) [parts by mass] | | | 1 | 1 | 1 | 1 | 1 | 1 |
| Photoinitiator (2) [parts by mass] | | | 1 | 1 | 1 | 1 | 1 | 1 |
| Surface modifier [parts by mass] | | | 0.1 | 0.1 | 0.1 | 0.1 | 0.1 | 0.1 |
| Ethyl acetate [parts by mass] | | | 102.7 | 104.9 | 104.5 | 111.5 | 97.7 | 103.5 |
| Methyl isobutyl ketone [parts by mass] | | | 102.7 | 104.9 | 104.5 | 111.5 | 97.7 | 103.5 |
| Test piece 1 | Initial evaluation | Appearance | A | A | A | A | A | A |
| BMC base material | | Adhesiveness | 4 | 4 | 4 | 4 | 4 | 4 |
| Thickness of undercoat | Heat resistance | Appearance | A | A | A | A | A | A |
| layer of 15 to 20 μm | (200° C. for 96 hours) | Adhesiveness | 4 | 4 | 4 | 4 | 4 | 4 |
| Test piece 2 | Initial evaluation | Appearance | A | A | A | A | A | A |
| BMC base material | | Adhesiveness | 4 | 4 | 4 | 4 | 4 | 4 |
| Thickness of undercoat | Heat resistance | Appearance | A | A | A | A | A | B |
| layer of 45 to 50 μm | (200° C. for 96 hours) | Adhesiveness | 4 | 4 | 4 | 4 | 4 | 1 |
| Test piece 3 | Initial evaluation | Appearance | A | A | A | A | A | |
| ABS base material | | Adhesiveness | 4 | 4 | 4 | 4 | 4 | |
| Thickness of undercoat | Heat resistance | Appearance | A | A | A | A | A | |
| layer of 15 to 20 μm | (80° C. for 96 hours) | Adhesiveness | 4 | 4 | 4 | 4 | 4 | |
| Test piece 4 | Initial evaluation | Appearance | A | A | A | A | A | |
| PC base material | | Adhesiveness | 4 | 4 | 4 | 4 | 4 | |
| Thickness of undercoat | Heat resistance | Appearance | A | A | A | A | A | |
| layer of 15 to 20 μm | (120° C. for 96 hours) | Adhesiveness | 4 | 4 | 4 | 4 | 4 | |
| Evaluation of storage stability | | | A | A | A | A | A | A |

The invention claimed is:

1. An acrylic-modified alkyd resin comprising a copolymer comprising:
an alkyd resin (A) having an unsaturated bond in a molecular structure; and
a polymerizable monomer (B) having an unsaturated bond in a molecular structure,
wherein the mass ratio [(A)/(B)] of the alkyd resin (A) having an unsaturated bond in a molecular structure to the polymerizable monomer (B) having an unsaturated bond in a molecular structure is 5/95 to 95/5.

2. The acrylic-modified alkyd resin according to claim 1, wherein the mass ratio [(A)/(B)] of the alkyd resin (A) having an unsaturated bond in a molecular structure to the polymerizable monomer (B) having an unsaturated bond in a molecular structure is 50/50 to 90/10.

3. The acrylic-modified alkyd resin according to claim 1, wherein the polymerizable monomer (B) having an unsaturated bond in a molecular structure comprises a hydroxyl group-containing (meth)acrylate monomer.

4. The acrylic-modified alkyd resin according to claim 1, wherein the polymerizable monomer (B) having an unsaturated bond in a molecular structure comprises an aromatic vinyl monomer.

5. A curable composition comprising:
the acrylic-modified alkyd resin according to claim 1; and
a (meth)acrylate compound (X).

6. A cured material obtained by curing the curable composition according to claim 5.

7. A coating material for undercoating for a thin inorganic film, the coating material comprising the curable composition according to claim 5.

8. A molded body comprising:
an undercoat layer made from the coating material according to claim 7 for undercoating for a thin inorganic film.

9. A curable composition comprising:
the acrylic-modified alkyd resin according to claim 2; and
a (meth)acrylate compound (X).

10. A curable composition comprising:
the acrylic-modified alkyd resin according to claim 3; and
a (meth)acrylate compound (X).

11. A curable composition comprising:
the acrylic-modified alkyd resin according to claim 4; and
a (meth)acrylate compound (X).

12. A cured material obtained by curing the curable composition according to claim 9.

13. A cured material obtained by curing the curable composition according to claim 10.

14. A cured material obtained by curing the curable composition according to claim 11.

15. A coating material for undercoating for a thin inorganic film, the coating material comprising the curable composition according to claim 9.

16. A coating material for undercoating for a thin inorganic film, the coating material comprising the curable composition according to claim 10.

17. A coating material for undercoating for a thin inorganic film, the coating material comprising the curable composition according to claim 11.

18. A molded body comprising:
an undercoat layer made from the coating material according to claim 15 for undercoating for a thin inorganic film.

19. A molded body comprising:
an undercoat layer made from the coating material according to claim 16 for undercoating for a thin inorganic film.

20. A molded body comprising:
an undercoat layer made from the coating material according to claim 17 for undercoating for a thin inorganic film.

* * * * *